March 25, 1952     H. A. MUSK     2,590,641
FREQUENCY SHIFT MONITOR
Filed May 28, 1949     2 SHEETS—SHEET 1

INVENTOR
Henry A. Musk.

March 25, 1952     H. A. MUSK     2,590,641
FREQUENCY SHIFT MONITOR

Filed May 28, 1949     2 SHEETS—SHEET 2

WITNESSES:

INVENTOR
Henry A. Musk.
BY
ATTORNEY

Patented Mar. 25, 1952

2,590,641

UNITED STATES PATENT OFFICE 2,590,641

FREQUENCY SHIFT MONITOR

Henry A. Musk, Baltimore, Md., assignor to Westinghouse Electric Corporation, East Pittsburgh, Pa., a corporation of Pennsylvania Application May 28, 1949, Serial No. 95,962

7 Claims. (Cl. 178—69)

This invention relates to communications equipment, and more particularly to an improved system and apparatus for computing and indicating the amount of shift of a signal frequency from a standard or central frequency, for example in frequency modulation communications systems.

It is a principal object of the invention to provide an apparatus for continuously monitoring a signal, carried either by radio or a wire channel, and for indicating either automatically or at selected times, the degree of shift of the carrier or signal frequency from some reference frequency. In general, in a frequency modulated system, the desired indication will be in terms of the carrier shift from the central or undeviated frequency, but the system is applicable as well to measurements from other standard or reference frequencies.

A particular and very important application of the invention is in the field of frequency-shift systems such as are used for the transmission of teletypewriter signals. A well known form of such teletypewriter signals consists of a continuous carrier frequency which is momentarily shifted by the direct current output pulse of a standard form of teletypewriter transmitter, so that during the "marking" condition, for example, the carrier has a somewhat different frequency from that corresponding to the "spacing" condition. The advantages of such a system for communication purposes, particularly over radio channels, are well known in the art. Heretofore, however, there has been no effective means for monitoring or indicating the amount of this frequency shift except in a static sense, with the channel operated on the shifted frequency for a considerable length of time. It would obviously be very desirable to provide an instantaneous indication of the magnitude of the frequency shift at any desired or predetermined time, without necessitating the interruption of the communication circuit, and the satisfaction of this requirement is an important feature of the present invention.

A further object of the invention is to provide a system and apparatus for monitoring the frequency shift of a carrier shift or frequency modulation channel to a very high degree of accuracy, and one which provides an indication based upon a very small "sample" of the frequency being measured, thereby achieving a high degree of resolution and permitting the desired check to be repeated as frequently as may be necessary.

Still another object is to provide a monitoring system and apparatus which require no manual adjustments, but which will at all times be ready to provide the desired test result immediately and without the necessity for extended calculation on the part of the operator.

An additional object of the invention is to provide a frequency shift monitor which is adapted both for more or less continuous monitoring at predetermined regular intervals, and to the provision of relatively infrequent indications which may be initiated by the operation of a simple manual control such as a push button or the like.

A further object of the invention is to provide an apparatus of the kind described which can be set at will to indicate either the "mark" deviation of the carrier or the "space" deviation.

For purposes of explanation, the design and operation of a preferred form of the system and apparatus will be disclosed in detail herein in connection with a frequency-shift teletypewriter system, but it will readily be understood by those skilled in this art that the same principles and apparatus may equally well be used to measure frequency shifts employed in facsimile, multiplex telegraph, and other forms of transmission, both of permutation types or of types such as Morse code or dot-and-dash forms, and the invention is to be construed as including all such forms of transmission insofar as the measuring of their essential frequency characteristics is concerned.

The following specification of the preferred form of the invention will best be understood by referring to the accompanying drawings in schematic form, forming a part hereof, and in which.

Figure 1:
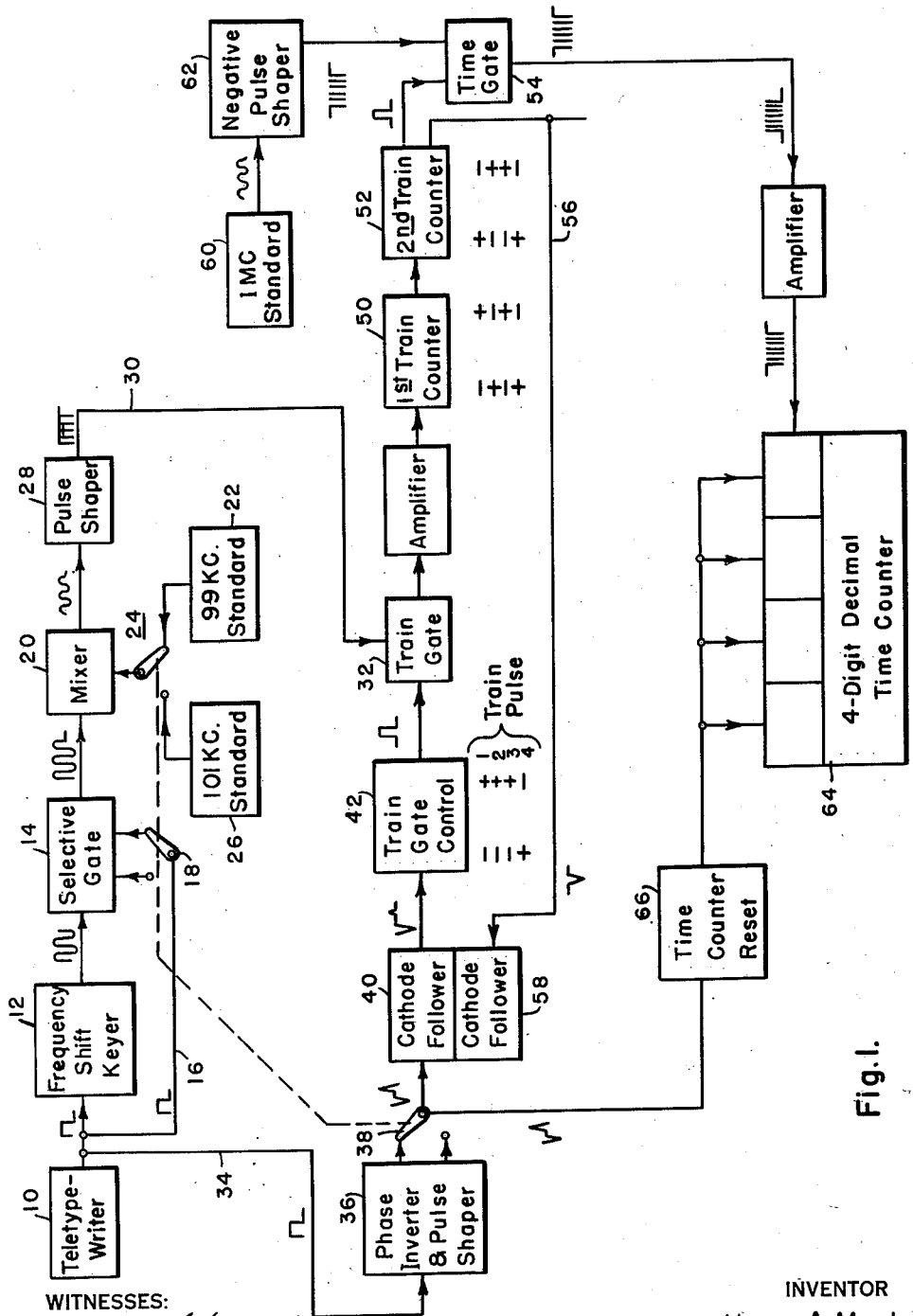
Figure 1 is a block diagram of the elements of the preferred frequency monitoring system.

For the sake of clarity and completeness, the system and apparatus shown in Fig. 1 of the appended drawings includes, in addition to the equipment actually used for monitoring purposes, a showing of a known form of teletypewriter transmitter or the like, designated by numeral 10, and which is presumed to provide an output signal consisting of a series of short voltage pulses corresponding to each character being transmitted, these pulses for example being thirty-five volt positive pulses each having a length of 22,000 microseconds corresponding to the "mark" condition, and intervening zero voltage corresponding to the "space" position. In order to convert this direct current or voltage output to a suitable frequency modulated carrier, a frequency shift keyer 12 also of a known form is controlled by the transmitter 10, and converts the positive D. C. pulses to deviations in the frequency of a carrier signal supplied by the keyer 12. For purposes of example only, it may be assumed that the carrier frequency of keyer 12 is 100 kilocycles per second, which is to be shifted to a new value of 101 kilocycles whenever a positive voltage pulse is received from transmitter 10, and is shifted to a second new value of 99 kilocycles in the absence of a voltage pulse from the transmitter. It will be understood that this is an idealized situation, and that the purpose of the frequency shift monitor of the present invention is to determine, as often as desired, the degree to which the carrier frequency has actually been shifted, and thus to determine whether the system is operating in the intended manner, so that adjustments may be made as required.

In general, the system of the present invention comprises the provision of a pair of standard frequencies differing by a slight amount from the undeviated carrier frequency of keyer 12, and beating a selected one of these standards with the deviated carrier, to provide a beat note which is proportional to the degree of shift of that carrier frequency. In order to accomplish this with a high degree of resolution and accuracy, it is necessary to provide means for selecting a small sample of the carrier output of keyer 12, and to ensure that this selection occurs during the existence of a "mark" or a "space" condition, as desired. The time duration of this small sample, in terms of number of cycles selected, is then accurately measured by means of an electronic counter which counts the number of cycles of a high frequency (herein, for example, one megacycle) reference source that occur during the time duration of the selected sample of the beat frequency derived from the transmitted carrier. This number of cycles of the high frequency reference source is then directly related to the desired deviation frequency, and if required the apparatus may be calibrated to indicate the frequency shift directly or by a suitable chart.

In the example chosen, with a keyer carrier frequency of 100 kilocycles, the two reference frequency standards may have frequencies of 99 and 101 kilocycles per second respectively, one or the other being used according to whether a "mark" or a "space" deviation reading is desired. When the keyer 12 is producing a shifted carrier frequency corresponding to "mark" condition, that is, lying somewhere between 100 kc. and 101 kc., the selected sample thereof is caused to beat with the 99 kc. standard, and the heterodyne frequency will therefore lie between 1 and 2 kc. It is convenient to establish the size of sample selected as two complete cycles of the heterodyne frequency, and the time duration of these two cycles will be measured in terms of a number of cycles of the one megacycle time standard, to provide the desired indication of carrier shift. Hence, a heterodyne frequency of 1 kc. (corresponding to zero frequency shift) will cause the microsecond counter to read 2,000 microseconds for the two-cycle period. A heterodyne frequency of 2 kc. (corresponding to 1 kc. of frequency shift or deviation) will cause the counter to read 1,000 microseconds for the two-cycle period. Thus an immediate indication of the frequency shift during "mark" condition is obtained, and by an exactly analogous process a similar indication as to the "space" deviation of frequency may be obtained by a manual selection of the 101 kc. reference standard in place of the 99 kc. standard.

In order to ensure that the selected sample represents a pure "mark" or a pure "space" condition, as desired, and not a mixture of these, gating circuits and suitable filters are employed, and means are also provided for starting the counting circuits automatically at the proper instant, and for recycling them automatically in preparation for the next frequency measurement.

Referring again specifically to the block diagram of Fig. 1 of the drawings, numeral 14 designates a selective gate apparatus which is operative to transmit only the "mark" or "space" frequency produced by the keyer 12, and this selective gate 14 is controlled or keyed by the pulse output from the teletypewriter 10, over a circuit or conductor 16 connected to the two-position switch 18 which is manually adjustable in accordance with whether a mark or a space frequency condition is to be measured. The manner in which this switch 18 acts to separate the mark and space conditions may be widely varied, but for purposes of explanation it may be assumed that in one position the positive or mark pulse from teletypewriter 10 is utilized to overcome the negative bias upon an amplifier stage contained in gate 14, while in the other position of switch 18 this positive pulse is applied to said amplifier in a sense to maintain it non-conductive. The specific mechanisms by which this may be done are well known in the art, and need not be further described for purposes of the present invention.

The energy output from gate 14 is thus, with switch 18 in the "mark" position, composed entirely of a frequency lying somewhere between 100 and 101 kc. In order to reduce this frequency to a value more susceptible of accurate measurement, the signal is conducted to the mixer stage 20 where it is heterodyned with a standard or reference frequency of precisely 99 kc., obtained from source 22 via switch 24, this switch being ganged with switch 18 so that when the two switches are in their "mark" positions, as just described, the 99 kc. standard 22 is employed to produce the heterodyne note, while with the switches in the "space" measuring position, the alternative reference standard 26, having a frequency of precisely 101 kc. would be utilized. With the adjustment as shown in Fig. 1, the output frequency from mixer stage 20 will lie somewhere between 1 kc. and 2 kc. This beat note is then fed to a negative pulse shaping stage 28 to form suitable train frequency pulses for driving a set of following binary counters.

As indicated above, the time duration of two cycles of the heterodyne output from mixer 20 will eventually be determined and will be proportional to the "mark" deviation frequency of keyer 12. In order to select precisely two cycles of this heterodyne frequency, the train pulses from pulse shaper 28 are fed over a circuit 30 and into a train gate 32 which is controlled by the original teletypewriter pulse from teletypewriter 10. This pulse is conveyed by a circuit 34 from the output of teletypewriter transmitter 10 and to a phase inverter and negative pulse shaper stage 36 which operates to convert the teletypewriter (D. C.) output pulses to alternate positive and negative control pulses, which then pass through one contact or the other of a two-position switch 38 ganged with switches 18 and 24 to a cathode follower stage 40 and thence to a train gate control tube or stage 42. This latter stage is adjusted normally to maintain the train gate 32 in a cut-off or non-conductive condition; however, when a negative pulse is fed to control tube 42 from the teletypewriter 10 via the cathode follower 40, tube 42 flips and opens the train gate 32, thus allowing train pulses arriving over conductor 30 to feed into the first train counter 50.

Figure 2:
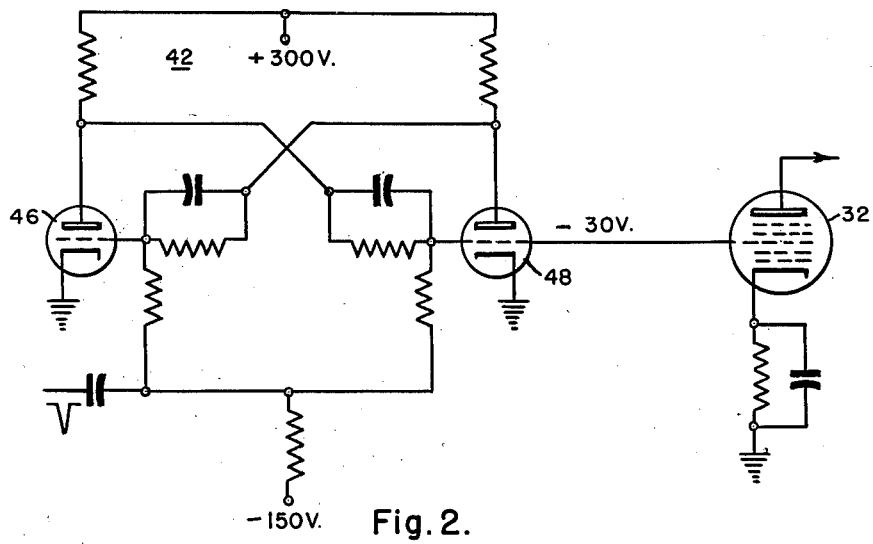
Fig. 2 is a schematic diagram of a preferred form of binary counter gate employed with the system of Fig. 1.

The operation of the train gate control stage 42 and the train gate 32 will be better understood by referring to the wiring diagram of this portion of the apparatus, shown in Fig. 2 of the drawings. The train gate control 42 is there shown as comprising two space discharge devices 46 and 48 (which may of course be in the same envelope), while the train gate stage itself may comprise the single multi-grid tube 32. There is always a direct D. C. connection from the grid of one of the devices 46 and 48 to the third grid of stage 32. The two cross-connected devices 46 and 48 constitute a triggered multivibrator of the Eccles-Jordan type controlled from the teletypewriter output, so that the potential of the third grid of stage 32 is maintained either at minus 30 volts (which cuts off said stage 32) or at plus 3 volts, which allows the tube 32 to amplify (for a type 6BE6 tube 32, the transconductance at these respective grid voltages is 10 and 450 microohms with one volt bias).

In the above manner, train pulses of mark or space character are selected and passed to the successive train counters 50 and 52, each characterized by counting or operating only on negative pulses. The first train pulse therefore flips the first train counter 50 but does not affect the second train counter 52. The second train pulse again flips the first train counter 50 thus sending a negative pulse to the second train counter 52 and hence flips the latter. This puts a positive potential on the control grid of the following (time gate control) stage 54 allowing the same to amplify. The third train pulse flips the first train counter 50 but does not affect the second train counter 52. The fourth train pulse flips the first train counter 50 and also flips the second train counter 52, shutting off the time gate stage 54. Hence, the time gate stage 54 has been allowed to amplify for precisely two cycles of the heterodyne frequency, as was desired. The polarities of these successive pulses are indicated by plus and minus signs beneath blocks 42, 50 and 52.

In order to prevent succeeding train pulses from entering the train counters, the output of the second train counter 52 is also fed via a conductor 56 through a cathode follower stage 58 into the train gate control tube 42; the fourth train pulse will flip this tube, because said pulse is negative, shutting off tube 42. However, previous train pulses will not have this effect, because they are positive. The train system is now in exactly the starting condition, hence no resetting is necessary, and the system is ready for a repeat operation from another teletypewriter pulse.

Having provided for automatic selection of precisely two complete cycles of the heterodyne output from the mixer stage and shaper 28, it is necessary to determine the time duration of such cycles. To this end, there is provided a third standard source 60 of (for convenience) one megacycle per second. This standard frequency is fed through a pulse shaper 62 and into the time gate stage 54, and thence through an amplifier to a four digit decimal counter 64 of well known construction. Since the period of the standard source 60 is one millionth of a second, the counter 64 will read the duration of the two-cycle period directly in micro-seconds, and is automatically reset to zero indication by a reset circuit 66 driven from the teletypewriter pulses passed through a phase inverter 36.

An amplifier is shown as located between the train gate stage 32 and the succeeding counter stage 50, as well as one between the time gate stage 54 and the counter 64. The purpose of these amplifiers is to give a phase reversal to the train and the time pulses so that the gate pulses will arrive at the counters positive and not affect such counters. If this were not done, it would be possible for the gate impulse wave fronts to actuate the counters and give false indications.

The time count, T, registered by counter 64 is convertible to frequency deviation by the equation:

$$f = \frac{1,000,000}{T/2} - 1,000$$

which can readily be put into chart form.

Figure 3:
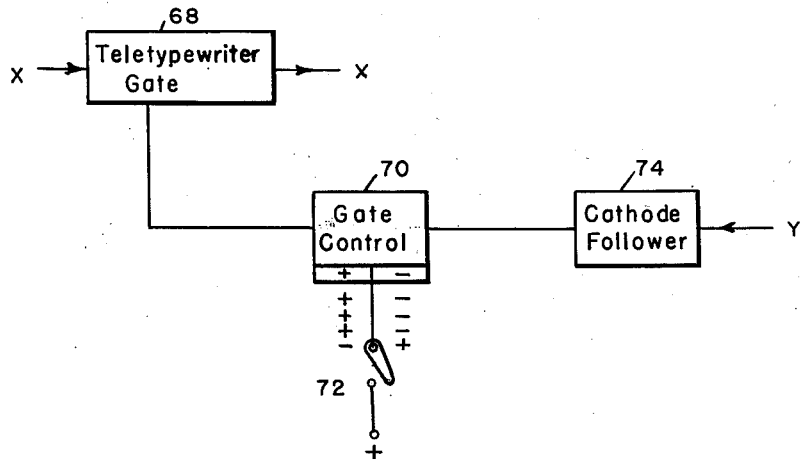
Fig. 3 is a block diagram of an auxiliary unit which may be embodied in the Fig 1 system to provide a manual selection of the time of monitoring indication, and automatic resetting of the monitoring cycle.

It is clear that the above-described system will give a continuous indication of frequency deviation, either for the "mark" or the "space" condition, in accordance with the adjustment of the ganged manual switches, since the measurement of the time duration of a selected pair of beat-note cycles is initiated by each successive teletypewriter pulse. If a manual or spot check is desired, as by operation of a manual push-button, a gate tube may be inserted at the point marked "X" in Fig. 1, following the switch 38. This arrangement is illustrated in the block diagram of Fig. 3, in which numeral 68 designates the gate tube, which in turn is under the control of a gate control stage 70 capable of being flipped into non-conducting condition by the fourth pulse from the second train counter 52, but can be rendered conductive by operation of the manual momentary switch 72. The pulses from the train counter used for turning off the gate control 70 are derived from point "Y" in Fig. 1, passing through the cathode follower stage 74. Equally well, the manual switch 72 could be replaced by a timer or the like, arranged to produce a deviation indication each five seconds, or at other convenient intervals The above description has been based upon the assumption that no wave shaping of the teletypewriter pulses was employed, and hence a delay of one cycle prior to the commencement of the time count would be adequate. If, however, wave shaping were to be employed, it would be desirable to incorporate a variable delay circuit after the teletypewriter transmitter 10 in order to make the train count commence at a later time.

While there has been described in detail a specific preferred embodiment of the invention for purposes of illustrating the invention, many changes in the system and apparatus disclosed could obviously be made by those skilled in this art, without departing from the spirit of the invention as defined in the appended claims.

I claim as my invention:

1. A frequency monitor for measuring the instantaneous deviation of a carrier frequency to either side of a nominal value in accordance with signal impulses, comprising a pair of fixed frequency reference oscillators, means for selecting a portion of said carrier deviated to one side of said nominal value, means for mixing said portion with the output of a selected one of said reference oscillators to produce a beat frequency corresponding to the magnitude of said deviation, a gating amplifier for amplifying said beat frequency, means controlled from said signal impulses for rendering said gating amplifier conductive only during the existence of a signal impulse, counter circuits controlled by said gating amplifier for rendering the latter non-conductive after completion of a predetermined number of cycles of said beat frequency, a fixed standard frequency oscillator, a cycle counter fed from said standard frequency oscillator, and circuit connections for rendering said cycle counter inoperative except during the said predetermined number of cycles of said beat frequency.

2. A frequency monitor for measuring the instantaneous deviation of a carrier frequency to either side of a nominal value in accordance with signal impulses, comprising a pair of fixed frequency reference oscillators, switch means for selecting a portion of said carrier deviated to one side of said nominal value, means for mixing said portion with the output of a selected one of said reference oscillators to produce a beat frequency corresponding to the magnitude of said deviation, a gating amplifier for amplifying said beat frequency, means including a phase inverter, cathode follower and control tube controlled from said signal impulses for rendering said gating amplifier conductive only during the existence of a signal impulse, counter circuits controlled by said gating amplifier for rendering the latter non-conductive after completion of a predetermined number of cycles of said beat frequency, a fixed standard frequency oscillator, a cycle counter fed from said standard frequency oscillator, and circuit connections for rendering said cycle counter inoperative except during the said predetermined number of cycles of said beat frequency.

3. A frequency monitor for measuring the instantaneous deviation of a carrier frequency to either side of a nominal value in accordance with signal impulses, comprising a pair of fixed frequency reference oscillators, switch means for selecting a portion of said carrier deviated to one side of said nominal value, means including a selective switch for mixing said portion with the output of a selected one of said reference oscillators to produce a beat frequency corresponding to the magnitude of said deviation, a gating amplifier for amplifying said beat frequency, means controlled from said signal impulses for rendering said gating amplifier conductive only during the existence of a signal impulse, counter circuits controlled by said gating amplifier for rendering the latter non-conductive after completion of a predetermined number of cycles of said beat frequency, a fixed standard frequency oscillator, a cycle counter fed from said standard frequency oscillator, circuit connections for rendering said cycle counter inoperative except during the said predetermined number of cycles of said beat frequency, and means connecting said switch means and said selective switch for simultaneous adjustment.

4. A frequency monitor for measuring the instantaneous deviation of a carrier frequency to either side of a nominal value in accordance with signal impulses, comprising a pair of fixed frequency reference oscillators, means for selecting a portion of said carrier deviated to one side of said nominal value, means for mixing said portion with the output of a selected one of said reference oscillators to produce a beat frequency coresponding to the magnitude of said deviation, a gating amplifier for amplifying said beat frequency, gate control means controlled from said impulses for rendering said gating amplifier conductive only during the existence of a signal impulse, counter circuits controlled by said gating amplifier for rendering the latter non-conductive after completion of a predetermined number of cycles of said beat frequency, a fixed standard frequency oscillator, a cycle counter fed from said standard frequency oscillator, circuit connections for rendering said cycle counter inoperative exept during the said predetermined number of cycles of said beat frequency, and manually operable means for initiating operation of said gate control means.

5. A frequency monitor for measuring the instantaneous deviation of a carrier frequency to either side of a nominal value in accordance with signal impulses, comprising a pair of fixed frequency reference oscillators, means for selecting a portion of said carrier deviated to one side of said nominal value, means for mixing said portion with the output of a selected one of said reference oscillators to produce a beat frequency corresponding to the magnitude of said deviation, a gating amplifier for amplifying said beat frequency, means controlled from said signal impulses for rendering said gating amplifier conductive only during the existence of a signal impulse, counter circuits controlled by said gating amplifier for rendering the latter non-conductive after completion of a predetermined number of cycles of said beat frequency, a fixed standard frequency oscillator, a cycle counter fed from said standard frequency oscillator, circuit connections for rendering said cycle counter inoperative except during the said predetermined number of cycles of said beat frequency, and phase reversal circuits between said gating amplifier and said counter circuits and between said standard frequency oscillator and said cycle counter.

6. A frequency shift monitor for communications systems of the type utilizing signal impulses to shift a carrier frequency from "mark" to "space" condition, comprising a selective gate circuit controlled by said signal impulses for passing carrier energy only during the existence of a preselected one of said conditions, means for producing a relatively low beat frequency corresponding to the magnitude of the shift in carrier frequency during the existence of said preselected condition, means for deriving pulses which are a function of said beat frequency, a first gating device for passing said pulses, a second gating device, a source of standard frequency, a cycle counter, means controlled by said pulses passed by said first gating device to allow signals from said standard frequency source to pass through said second gate to said cycle counter during a predetermined number of cycles of said beat frequency only, means responsive to initiation of a said signal impulse for opening said first gate, and means controlled by the termination of the said signal impulse for resetting said cycle counter.

7. A frequency monitor for communications systems of the type utilizing keying impulses to control the output of a transmitter, comprising means for deriving pulses which are a function of the transmitter output frequency, a first gating device for passing said pulses, a second gating device, a source of standard frequency, a cycle counter, means controlled by said pulses passed by said first gating device to allow signals from said standard frequency source to pass through said second gate to said cycle counter during a predetermined number of cycles of said transmitter output frequency only, means responsive to initiation of a keying impulse for opening said first gate, and means controlled by the termination of said keying impulse for resetting said cycle counter.

HENRY A. MUSK.

REFERENCES CITED

The following references are of record in the file of this patent:

UNITED STATES PATENTS

| Number | Name | Date |
| --- | --- | --- |
| 2,405,597 | Miller | Aug. 13, 1946 |